United States Patent

Diller et al.

Patent Number: 5,586,491
Date of Patent: Dec. 24, 1996

[54] DISPOSABLE BARBECUE GRILL SHIELD

[76] Inventors: Robert J. Diller; Barbara J. Diller, both of 800 Lagunita Dr., Soquel, Calif. 95073

[21] Appl. No.: 431,311

[22] Filed: Apr. 28, 1995

[51] Int. Cl.[6] ................................................ A47J 27/00
[52] U.S. Cl. ............................ 99/450; 99/444; 126/25 R
[58] Field of Search ............................. 99/481, 483, 446, 99/444, 445, 450; 126/25 R, 39 M, 214 D, 221

[56] References Cited

U.S. PATENT DOCUMENTS

| | | | |
|---|---|---|---|
| 2,593,592 | 4/1952 | Miller | 126/221 |
| 2,806,227 | 9/1957 | Arbetter | 126/39 M |
| 3,211,082 | 10/1965 | Sachnoff et al. | 126/39 M |
| 3,490,123 | 1/1970 | Clark | 126/59 |
| 3,555,994 | 1/1971 | Nemetz et al. | 99/444 |
| 3,570,469 | 3/1971 | Jones | 99/444 |
| 3,717,083 | 2/1973 | Karapetian | 99/445 |
| 4,240,398 | 12/1980 | Lindop | 126/25 R |
| 4,394,410 | 7/1983 | Osrow et al. | 99/446 |
| 4,428,281 | 1/1984 | Miller | 99/445 |
| 4,763,639 | 8/1988 | Goldsworthy | 126/25 R |
| 4,784,109 | 11/1988 | Korpan | 126/39 M |
| 4,969,449 | 11/1990 | Levin | 126/332 |
| 5,399,439 | 3/1995 | Rasmussen | 99/450 |
| 5,447,097 | 9/1995 | Rhee | 99/444 |

*Primary Examiner*—David Scherbel
*Assistant Examiner*—James F. Hook

[57] ABSTRACT

A disposable flexible foil product placed on a barbecue grill comprises a sheet of metal foil with rectangular vents (15). The pattern consists of two sets of vents equally offset from the center with a space in the middle (17). The pattern is repeated longitudinally with a central divider (16) between patterns. The foil has a flat bottom surface. The foil is dispensable either from a roll or it is packaged in flat sheets or pans, having a scored line spaced in from the edge to allow for manual upturning of the edges.

4 Claims, 4 Drawing Sheets

Fig. 3.
Fig. 3B.
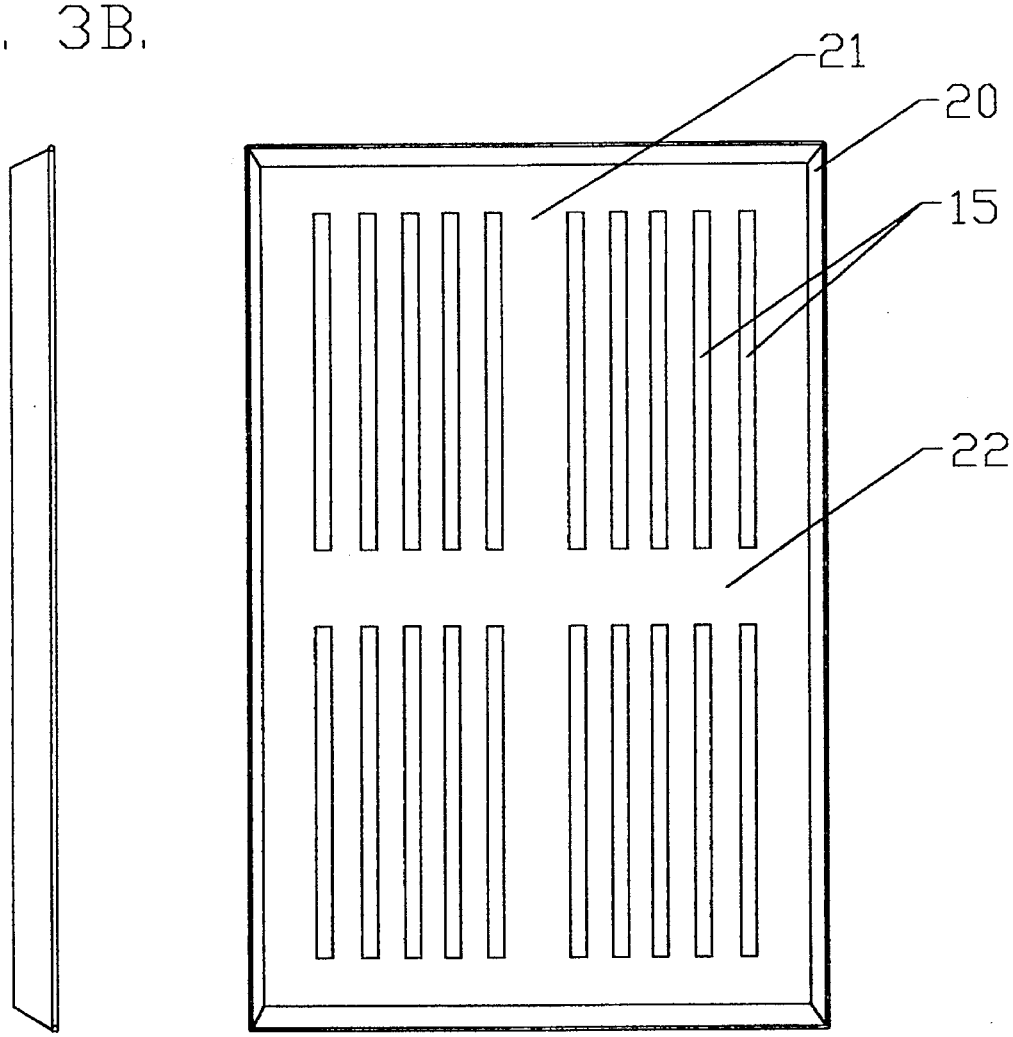
Fig. 3A.

DISPOSABLE BARBECUE GRILL SHIELD

BACKGROUND—FIELD OF INVENTION

This invention relates to a flexible disposable foil barbecue shield, specifically to a flat metal sheet or pan with rectangular vents.

BACKGROUND—DESCRIPTION OF THE PRIOR ART

The use of foil for barbecuing is known in the prior art. More specifically, disposable metal foils with vents have been devised with a number of configurations.

For example, a disposable grill cover can be seen in U.S. Pat. No. 3,555,994, Jan. 19, 1971, in which the foil is individually formed around each food supporting wire of the grill by means of finger pressure. This process is labor intensive and lacks practicality for common use due to the extensive time and effort required to affix and remove the cover to and from the grill.

Another disposable cover for a barbecue grill can be seen in U.S. Pat. No. 4,763,639, Aug. 16, 1988 in which the foil contains a plurality of round perforations and has an undercoating of wood chips and a bonding agent. The undercoating prevents the foil from sitting flat on the grill, thereby reducing moveability and practicality, and adding to the expense of the production and thereby the cost of the cover. The bonding agent and wood chips also melt and burn in the flame and cause further debris on the existing grill. The bonding agent also has the effect of blocking the holes as it melts with the heat. Also, the holes allow for less transfer of aromatic enhancement to the food and do not provide the expected appearance of the barbecue grill pattern on the food. The foil cannot readily be torn to fit varying sizes of barbecue grills as the tearing capability of the foil is significantly impaired by having round holes at the tear points. Finally, the holes do not allow for easy view or accessibility of the coals beneath when the foil is in place.

U.S. Pat. No. 4,969,449, Nov. 11, 1990 shows yet another configuration of a disposable grill cover. The cover is corrugated with holes, and sits so that the troughs of the corrugation align with the spacings of the wire grill. Because of the cross members of the grill, the cover does not uniformly cover the grill. The holes do not provide the desired degree of aromatic enhancement or the expected appearance of the barbecue pattern on the food. Also, because the foil does not sit flat on the grill, it does not provide the advantage of moveability and is inconvenient for use with the barbecue spatula as the spatula tends to catch on its edges. Also, The tearing capability of the foil is significantly impaired by having round holes at the tear points. There is limited view and accessibility to the coals beneath when the foil is in place.

Therefore, it can be appreciated that there is a continuing need for a disposable barbecue grill shield which sits flat on the grill, is non labor intensive to use, is adjustable to any size grill, is easily moveable about the grill during barbecuing so as to take best advantage of the varied heat, provides the desired aromatic enhancement and the expected barbecue pattern on the food, prevents food from falling into the heat source, is easy to tear uniformly into the desired length, provides view and accessibility to the coals beneath, and is easy and inexpensive to manufacture and package. In these respects, the present invention substantially fulfills these needs.

OBJECTS AND ADVANTAGES

Accordingly, several objects and advantages of the present invention are:

(a) to provide a grill cover for the existing grill of a barbecue which is easy and inexpensive to use, manufacture, and package.

(b) to provide a grill cover which sits flat on the existing barbecue grill providing a protective cover both for the grill and for the food to be barbecued.

(c) to provide a grill cover with vents which provides all of the expected advantages of barbecuing by allowing for maximum air flow and for the grill pattern on the food.

(d) to provide a grill cover with a flat, smooth bottom surface which can be easily moved or positioned at will on the top of the grill so as to take best advantage of the heat and to assist in the prevention of burning of the food, especially at the outside edges of the food.

(e) to provide a grill cover with edges which can be upturned or positioned against the side of the barbecue unit to prevent food from falling into the heat source.

(f) to provide a grill cover which has scoring in the sides of the foil in sheet and roll form to assist in making an evenly upturned edge to provide for added protection for the food.

(g) to provide a grill cover with vents that allow for viewing and arranging of coals beneath without removal of the foil from the heat source.

(h) to provide a grill cover in pan form which offers the ability to carry food to and from the barbecue without removing the food from the pan.

(i) to provide a grill cover in pan form where the lip of the pan prevents food from falling into the heat source.

(j) to provide a grill cover in pan form where the pan can be readily moved and adjusted on the grill.

Further objects and advantages of the disclosed invention are the ease of manufacture, packaging, and use making it less expensive and practical for use with all barbecue grills, no matter how large or small the grill. Still further advantages will become apparent from a consideration of the ensuing description and drawings.

BRIEF DESCRIPTION OF DRAWINGS

FIG. 3 is a perspective view of the foil in rectangular shaped pan form.

FIG. 3A is the end view of the pan of FIG. 3. FIG. 3B is the side view of FIG. 3.

View B—B is the side view of the pan of FIG. 3.

Figure 4:
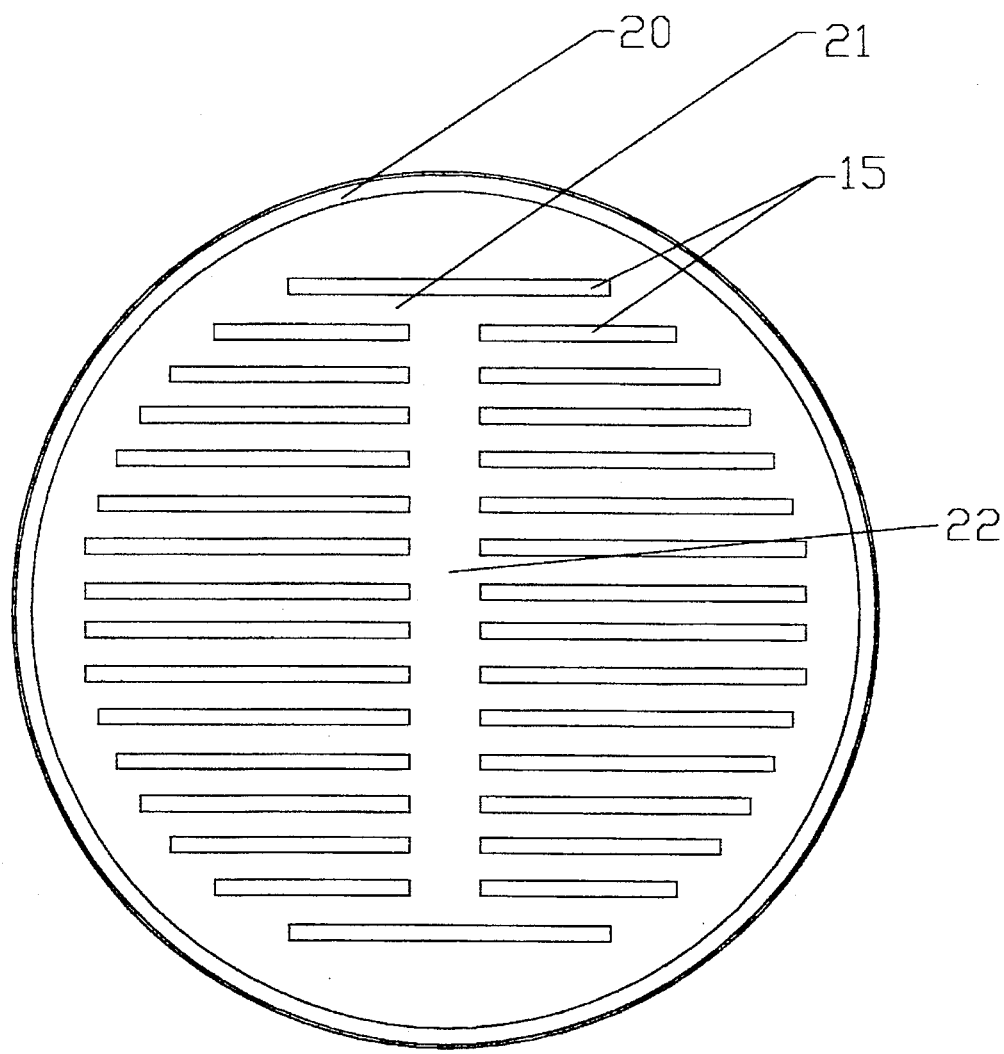

FIG. 4 is a perspective view of the foil in round shaped pan form.

View 4A of FIG. 4 is a side view of the pan of FIG. 4.

DETAILED DESCRIPTION FIGS. 1 THROUGH 4

Figure 1:
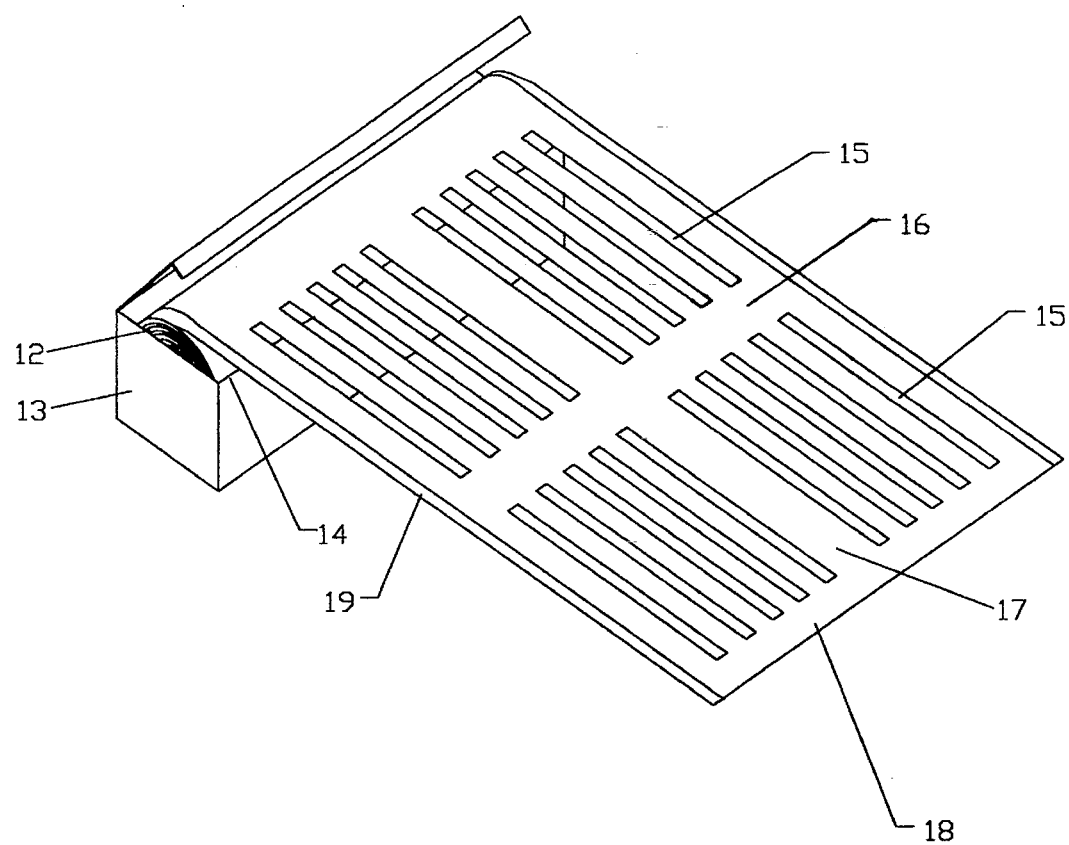
FIG. 1 is a perspective view of the preferred embodiment of the invention showing a roll of the foil partially dispensed from the roll.

FIG. 1 shows a preferred embodiment of the invention, wherein a roll of metal foil 12 is dispensed from a box 13 with a serrated edge 14 for the purpose of cutting the foil to the desired length.

Rectangular vents 15 are arranged in a pattern consisting of two sets of vents equally offset from the center with a space in the middle 17. The pattern is repeated longitudinally with a center divider 16 between patterns. The vents 15 are of sufficient length and width to allow for thorough exposure of food to aromatic enhancement from the barbecue while preventing food from falling into the heat source. Space 17 enhances tensile strength of the foil and is a minimum width of one quarter the length of the vent 15.

Space 16 is the tear space between vent patterns allows for tensile strength of the foil for ease in uniform tearing when dispensed from a roll and is a minimum of one quarter the length of the vent 15. The tear edge 18 can be in any space 16, depending on the length of foil which is desired. The score line 19 along the outside edges of the foil allows for a small rim to be manually and uniformly upturned or to be propped against the inside edge of the barbecue unit to further keep food from falling into the heat source and to protect the outside edges of the food from burning.

Figure 2:
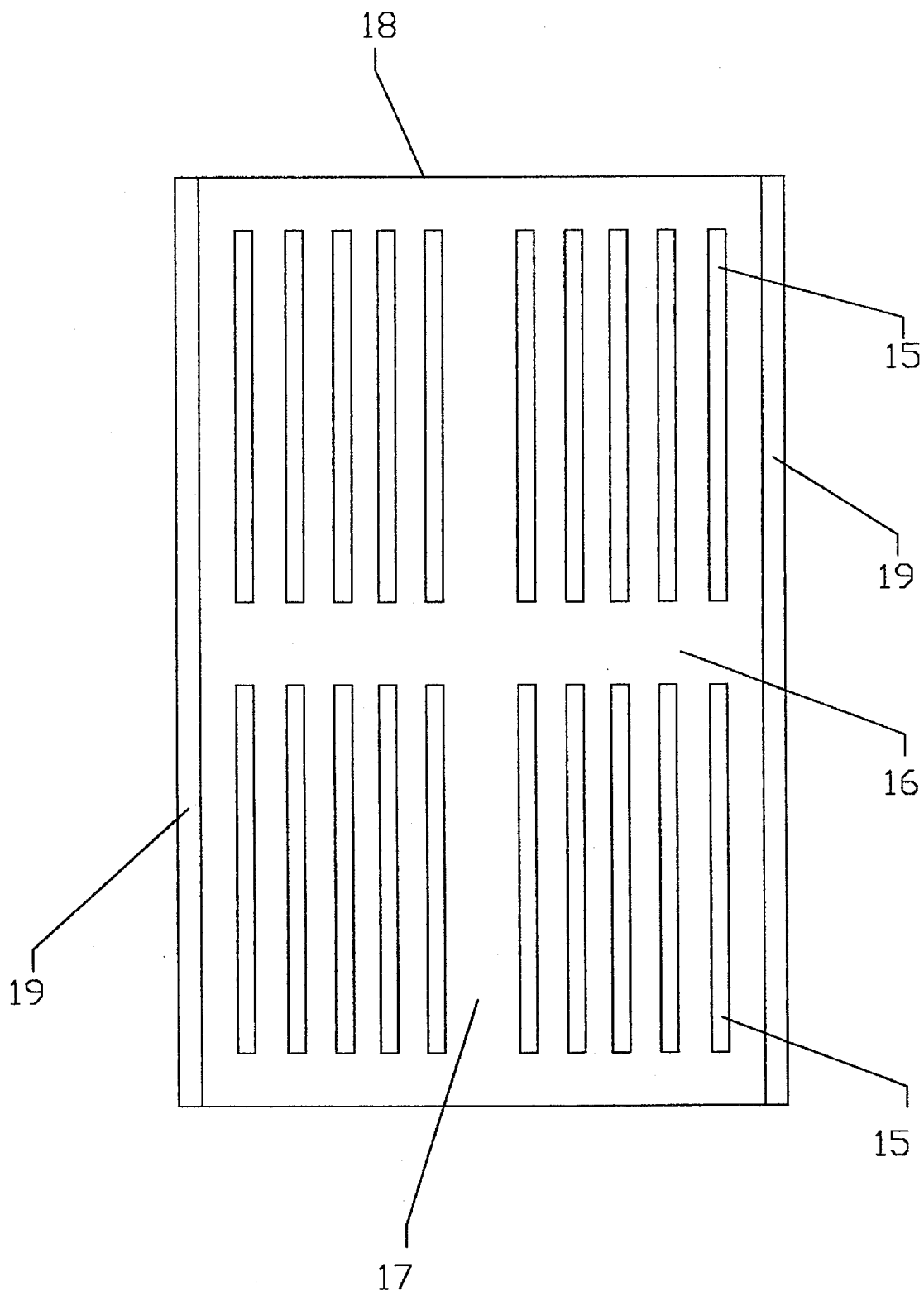
FIG. 2 is a perspective view of the foil in sheet form

FIG. 2 shows the same foil of FIG. 1 in individual sheet form. This may be practical for individual packaging of pre cut sheets of foil.

Figure 4A:
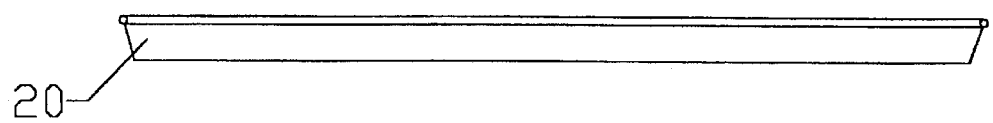

FIGS. 3 and 4 show the second embodiment of the invention in pan form. FIG. 3 shows the pan in rectangular shape and FIG. 4 shows the round shape. The rectangular vents 15 are in the bottom of the pan and consist of two sets of vents equally offset from the center with a space in the middle 21. The space 21 is a minimum of one sixth the length of the vent 15. The pattern of vents 15 repeats longitudinally with a center divider space 22. The number of repeating vent patterns depends on the size of the pan. The space 22 is a minimum of one sixth the length of the longest vent 15. The pan has a small upstanding edge 20 which allows for ease in handling the pan as well as providing an edge for preventing the food from falling into the heat source while turning the food. The upstanding edge further provides added protection from burning the edges of the food. The pan sits flat on top of the grill. Thus the pan may be moved on and off of the heat source or around on top of the heat source readily and without removing the food from the pan. FIG. 3A reveals the end view of the pan of FIG. 3 and shows a relative perspective of the preformed edge of the pan of FIG. 3. FIG. 3B reveals the side view of FIG. 3 and shows a relative perspective of the preformed edge of the pan of FIG. 3. FIG. 4A reveals the side view of the pan of FIG. 4 and shows a relative perspective of the preformed edge of the pan of FIG. 4.

SUMMARY, RAMIFICATIONS, AND SCOPE

Accordingly, the reader will see that the disposable grill cover of this invention addresses the problem of grill cleaning and food protection by providing a protective cover which does not interfere with the full barbecue effect. The rectangular vents allow the aromatic smoke to access the food thoroughly while allowing juices to easily reach the heat source below to enhance the aromatic quality. in addition to allowing maximum air flow transfer, the vents also allow for the anticipated barbecue grill pattern on the food.

The pattern of the vents and the spaces between maximize barbecue effect while providing tensile strength and allow for smooth uniform tearing when used with a serrated edge. The foil is dispensable to cover every size grill, and is convenient, useable, inexpensive, and packageable.

We claim:

1. A disposable shield for covering an existing barbecue grill comprising a flexible metal foil in the form of a roll having edges with a repeating pattern of rectangular vents, and a score line spaced inwardly from the edges of the roll to allow for manual upturning of the edges against a side of the grill after a desired length of foil is removed from the roll.

2. The shield of claim 1 wherein the vent pattern consists of two sets of vents equally offset from a longitudinal line of the foil with a space in the middle to provide tensile strength to the foil shield.

3. The shield of claim 1 wherein the vent pattern is repeated longitudinally with a center divider between patterns for smooth and uniform tearing when used with a serrated edge.

4. The shield of claim 1 wherein the said foil is packageable in roll form for selectable lengths to fit any grill size.

\* \* \* \* \*